US008954810B2

(12) United States Patent
McDuff

(10) Patent No.: US 8,954,810 B2
(45) Date of Patent: Feb. 10, 2015

(54) PROGRESSIVE VALIDATION CHECK DISABLING BASED UPON VALIDATION RESULTS

(71) Applicant: International Business Machines Corporation, Armonk, NY (US)

(72) Inventor: Steve McDuff, Markham (CA)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/683,764

(22) Filed: Nov. 21, 2012

(65) Prior Publication Data

US 2014/0143603 A1    May 22, 2014

(51) Int. Cl.
*G06F 11/00*     (2006.01)
*G06F 11/36*     (2006.01)

(52) U.S. Cl.
CPC ..................................... *G06F 11/36* (2013.01)
USPC ........................................................ 714/47.1

(58) Field of Classification Search
CPC ............ G06F 11/3409; G06F 11/3466; G06F 11/3664; G06F 11/36
USPC ............................................... 714/47.1, 38.1
See application file for complete search history.

(56) References Cited

U.S. PATENT DOCUMENTS

| | | | |
|---|---|---|---|
| 6,408,403 B1* | 6/2002 | Rodrigues et al. | 714/38.11 |
| 7,895,565 B1 | 2/2011 | Hudgons et al. | |
| 8,812,913 B2* | 8/2014 | Colline | 714/47.2 |
| 2003/0200483 A1* | 10/2003 | Sutton | 714/25 |
| 2010/0174893 A1 | 7/2010 | Rivera | |
| 2010/0263043 A1* | 10/2010 | Xu | 726/17 |
| 2011/0173592 A1 | 7/2011 | Elnozahy et al. | |
| 2012/0060056 A1* | 3/2012 | Lee et al. | 714/15 |
| 2012/0079456 A1 | 3/2012 | Kannan et al. | |
| 2012/0117540 A1 | 5/2012 | Hagerty | |
| 2014/0109050 A1* | 4/2014 | Gibbens | 717/124 |
| 2014/0239171 A1* | 8/2014 | Platt et al. | 250/282 |

OTHER PUBLICATIONS

Gary Karasiuk, Rational® Application Developer Performance Tips, Article, Mar. 2006, pp. 1-22, IBM Corporation, Published online at: http://www.ibm.com/developerworks/wikis/download/attachments/113606723/radtipsv754.pdf?version=1.

(Continued)

*Primary Examiner* — Yair Leibovich
(74) *Attorney, Agent, or Firm* — Lee Law, PLLC; Christopher B. Lee

(57) ABSTRACT

Execution statistics are gathered that represent results of execution of a validation check that evaluates code performance within an executing application. A determination is made as to whether the gathered execution statistics for the execution of the validation check match configured criteria to disable the validation check. The validation check is programmatically disabled in response to determining that the gathered execution statistics for the execution of the validation check match the configured criteria to disable the validation check.

17 Claims, 4 Drawing Sheets

(56) References Cited

OTHER PUBLICATIONS

Aniruddha Baljekar, Dynamic Assertion Based Verification using PSL and OVL, Archived Webpage/site, Dec. 31, 2009, pp. 1-5, Design and Reuse, Published/archived online at: http://web.archive.org/web/20091231212033/http://www.design-reuse.com/articles/12947/dynamic-assertion-based-verification-using-psl-and-ovl.html.

Author Unknown, Thinking in Java: Assertion Syntax, Online Book Chapter, Printed from website on Nov. 21, 2012, pp. 1-3, Linuxtopia.org, Published online at: http://www.linuxtopia.org/online_books/programming_books/thinking_in_java/TIJ317_004.htm.

* cited by examiner

PROGRESSIVE VALIDATION CHECK DISABLING BASED UPON VALIDATION RESULTS

BACKGROUND

The present invention relates to validation processing. More particularly, the present invention relates to progressive validation check disabling based upon validation results.

Validation checks may be alternatively referred to as assertions within certain systems. Validation checks may be created in a software build by a developer and used during development to validate functionality of different portions of the software build within a functioning development system. Validation checks are removed by the developers prior to a final build process and deployment of the software build to execute within customer systems.

BRIEF SUMMARY

A method includes gathering, via a processor, execution statistics that represent results of execution of a validation check that evaluates code performance within an executing application; determining whether the gathered execution statistics for the execution of the validation check match configured criteria to disable the validation check; and disabling the validation check programmatically in response to determining that the gathered execution statistics for the execution of the validation check match the configured criteria to disable the validation check.

A system includes a memory and a processor programmed to: gather execution statistics within the memory that represent results of execution of a validation check that evaluates code performance within an executing application; determine whether the gathered execution statistics for the execution of the validation check match configured criteria to disable the validation check; and disable the validation check programmatically in response to determining that the gathered execution statistics for the execution of the validation check match the configured criteria to disable the validation check.

A computer program product includes a computer readable storage medium having computer readable program code embodied therewith, where the computer readable program code when executed on a computer causes the computer to gather execution statistics that represent results of execution of a validation check that evaluates code performance within an executing application; determine whether the gathered execution statistics for the execution of the validation check match configured criteria to disable the validation check; and disable the validation check programmatically in response to determining that the gathered execution statistics for the execution of the validation check match the configured criteria to disable the validation check.

DETAILED DESCRIPTION

Figure 1:
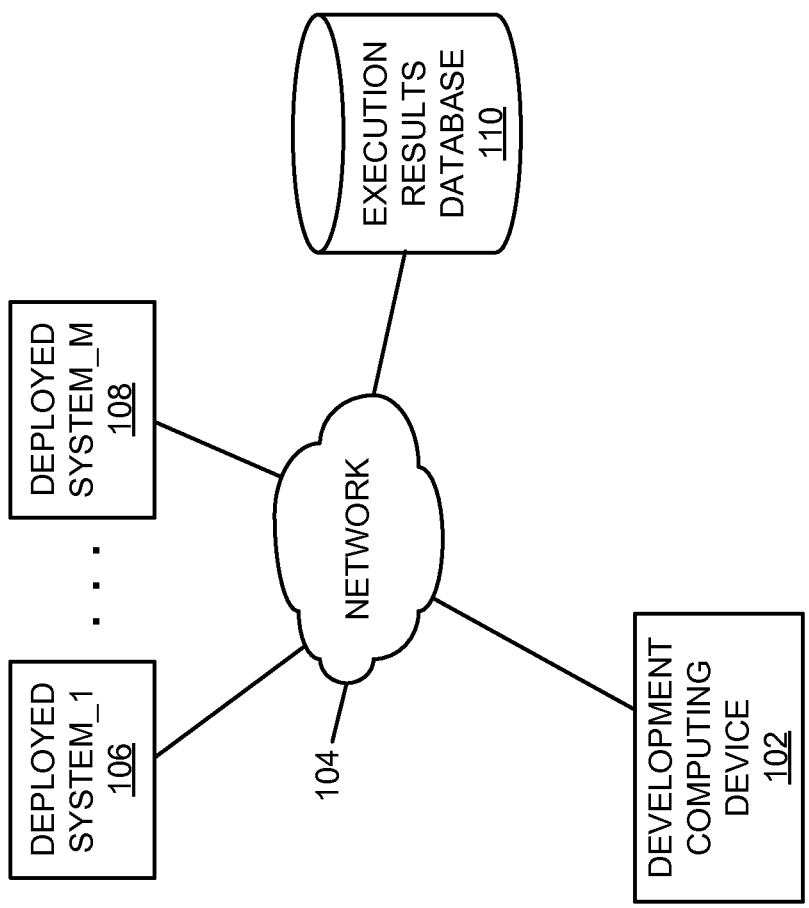
FIG. 1 is a block diagram of an example of an implementation of a system for progressive validation check disabling based upon validation results according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides progressive validation check disabling based upon validation results. The present technology may be utilized to deploy a system and to obtain validation data, such as validation check execution results, from the deployed system. The validation checks that provide successful validation results over time may be disabled to gain efficiency of system operations. Validation check parameters may be added to each validation check and may be used to accumulate and measure the validation check execution results. The system may be configured with validation check disablement thresholds/criteria that, when met, result in programmatic disabling of the validation checks based on the accumulated validation check execution statistics. The validation checks may themselves execute to evaluate the validation check disablement criteria and disable themselves programmatically. Alternatively, the validation checks may be monitored by a separate process and the validation checks that satisfy the validation check disablement criteria may be disabled by the separate process. Disabled validation checks may be reenabled/reactivated after they are disabled and their respective validation check parameters may be cleared or set to alternative values to restart validation processing for any given validation check.

The successful validation checks that satisfy the configured thresholds may be considered to have fulfilled their intended purpose within the given environment. In view of the successful executions over time, continued execution of the successful validation checks may consume resources (e.g., processor cycles, memory, etc.) that may be utilized by other processes to improve system execution. As such, successful validation checks that satisfy the configured thresholds may progressively be disabled, resulting in increased system performance over time, while maintaining a reasonable level of confidence that no errors would otherwise be found by the disabled validation checks if they were continuously executed.

Validation check execution information may be recorded/logged to document validation check enablement and disablement, as well as the respective statistics associated with each validation check. This validation check execution information may be evaluated to determine overall validation check execution and efficiency within a given system.

Additionally, where a validation check has been disabled and a system issue is detected, a warning may be generated or logged to alert system maintenance personnel. The maintenance personnel may evaluate the validation check execution information and other information as appropriate to determine whether evaluation of the system issue may benefit by re-enabling a particular validation check. The disabled validation checks may be reactivated as appropriate for a given implementation, such as to recheck the code that is monitored by the validation checks. The reactivated validation checks may again be disabled programmatically at the respective thresholds or may be disabled in response to additional accumulation of execution results (e.g., executed one or more times again with success). Accordingly, the additional execution results provided by the reactivated validation checks may provide useful information for system maintenance personnel to diagnose system performance and system issues over time without requiring continual execution of validation checks.

To provide a more detailed example, as part of a system deployment (or during development) all validation checks may be enabled. For purposes of the present description, the terms "validation check" and "assertion check" may be used interchangeably. The effectiveness of the validation checks may be monitored over time as the validation checks execute. For example, using an assertion check example, a system may start with the assertion fully enable and accumulate statistics about how frequently the assertion check identified a problem. Once this assertion check runs a pre-determined number of times without detecting any error, the assertion check may be disabled. The assertion check may be disabled by the system or by the assertion check itself, as appropriate for a given implementation.

Regarding automated disabling of validation checks, a validation control task may monitor gathered validation check statistics by sweeping a list of validation checks configured on a system to identify validation checks that match the validation check disable criteria and may disable any identified validation checks. The validation control task may be executed as a separate process and may evaluate validation checks for disabling periodically or in any other scheduled manner. Alternatively, the validation control task may be implemented as part of each validation check itself such that each time the validation check executes it evaluates itself for potential disabling.

Activating a disabled validation check may be performed by a user of a system by invoking a command to activate a particular validation check, a list/subset of available validation checks, or all available validation checks on the system that are disabled. This command may be called/invoked, for example, when deploying a change that may benefit from having the checks functional again. As such, the present technology provides for dynamic automated disabling of validation checks to improve system performance over time and provides controls for granular reactivation of validation checks if they again become useful.

Regarding validation check parameters, one example validation check parameter includes an "automatic disable percentage threshold." The automatic disable percentage threshold represents a percentage of validation checks that identify no errors (e.g., provide no additional utility) before the validation check is disabled. For example, an automatic disable percentage threshold of ten percent (10%) will only disable validation checks that catch errors less than ten percent (10%) of the times they run.

Another example validation check parameter includes an "automatic disable minimal count." The automatic disable minimal count represents a number of times a validation check must be run before it may be considered safe to disable. For example, an automatic disable minimal count of one-hundred (100) means the validation check must be run at least 100 times before it may be considered safe to disable. It should be noted that the automatic disable minimal count operates in conjunction with the automatic disable percentage threshold. As such, the automatic disable percentage threshold must also have been met before the validation check may actually be disabled.

An additional example validation check parameter includes a "total validation execution count." The total validation execution count represents a number of times the validation check has been executed (e.g., prior to being disabled).

Another example validation check parameter includes a "failed validation execution count." The failed validation execution count represents the number of times the validation check has been executed and has detected a problem. Another parameter that is conversely related to the failed validation execution count is a "successful validation count" that represents the number of successful executions of the respective validation check. As such, the respective thresholds for disabling a validation check may be based upon an error rate or a success rate, as appropriate for a given implementation, as described in more detail below.

For management of individual validation checks, a unique validation check identifier (ID) may be assigned to each validation check. The different validation checks may be distinguished from each other and individually managed using their respective validation check ID.

One or more configuration files may be maintained that document configuration information, such as the respective threshold values associated with each validation check that specify the criteria for keeping the respective validation checks enabled. The configuration file(s) may also include statistics for all validation checks, statistics for validation checks that match a particular pattern, and statistics for validation checks that have specific validation check IDs, as appropriate for a given implementation. As such, the configuration information may be granularly managed per validation check or with respect to groupings of validation checks. It should be noted that while configuration files are described within the present example, the configuration information may alternatively be maintained within a database, within an external software service, or in another manner as appropriate for a given implementation.

The following example pseudo code represents one possible implementation of functionality controlled by a validation check itself to implement progressive validation check disabling based upon validation results.

```
Validation check starts
{
   If the validation check is disabled
   {
      Abort validation
   }
   Else (the validation check is enabled)
   {
      Run the validation
      Increment the Total Validation Execution Count in the statistics
      If the validation check was successful
      {
         Increment the Successful Validation Count in the statistics
         Calculate error rate;
         If Total Validation Execution Count meets or exceeds Automatic
         Disable Minimal Count AND error rate below Automatic Disable
         Percentage Threshold in the statistics
         {
            Disable the validation check
         }
      }
      Else (the validation check failed)
      {
```

-continued

```
      Increment the Failed Validation Execution Count in the statistics
      Report the error (through a log or a user interface message)
    }
  }
}
```

It may be assumed for purposes of the example pseudo code description that the validation check that executes the example pseudo code is initially enabled. As can be seen within the example pseudo code above, the validation check initially determines whether it has been disabled (by its own processing as described below). If the validation check has already been disabled, it aborts any additional processing. As such, efficiency may be obtained by determining whether the validation check has been disabled prior to accumulating or evaluating execution statistics. If the validation check has not been disabled (the default initial condition for this example), the validation check runs to evaluate execution of the code monitored by the validation check. The validation check then increments its own total execution count parameter (e.g., Total Validation Execution Count) in its own set of statistics to document the number of times the validation check has executed. The validation check then determines whether the validation check is successful (e.g., no monitored code error detected). If the validation check is successful, the validation check increments its own successful execution count parameter (e.g., Successful Validation Execution Count) as its first aspect of processing under this branch of processing. Conversely, if the validation check is not successful, the validation check increments its own failed execution count parameter (e.g., Failed Validation Execution Count) as its first aspect of processing under this branch of processing, and issues an error report or logs the detected monitored code error.

As such, over time, the validation check gathers its own execution statistics including the total execution count parameter, the successful execution count parameter, and the failed execution count parameter. These parameters may be incremented as appropriate and utilized during each execution of the validation check as described in more detail below.

Returning to the description of the validation success branch of the example pseudo code, the example pseudo code implements a determination by the validation check as to whether to disable itself within this successful execution branch. As such, failed executions accumulate statistics, but do not participate in the disablement determination by the validation check.

It should be noted that, based upon the accumulated statistics, the validation check may implement either success rate processing or error rate processing to determine whether to disable itself. If success rate processing is utilized, the successful execution count parameter may be compared to the total execution count parameter (e.g., Successful Validation Execution Count divided by Total Validation Execution Count) to derive a success rate value to use to make the disablement determination. A success disable percentage threshold may be defined to determine when the validation check is configured to disable itself.

The example pseudo code utilizes error rate determination to reduce complexity of the example pseudo code in view of the options for determining when the validation check is configured to disable itself. As such, within the validation success branch of the example pseudo code, the validation check calculates an error rate (again could alternatively or additionally calculate the success rate) after incrementing the successful execution count parameter. The error rate may be calculated by comparing the failed execution count parameter to the total execution count parameter (e.g., Failed Validation Execution Count divided by Total Validation Execution Count).

The validation check then makes a determination as to whether to disable itself using the example error rate calculation. To determine whether to disable itself, the validation check makes two comparisons with configured values and logically combines those comparisons using the "AND" logical operator.

The first comparison of the disablement determination is whether the validation check, as represented by the total validation execution count parameter, has executed a configured minimal number of times, which is referred to within this example as a configured Automatic Disable Minimal Count (e.g., Total Validation Execution Count meets or exceeds Automatic Disable Minimal Count). If this comparison results in an affirmative determination, this branch of the logical operation is true.

The second comparison of the disablement determination is whether the error rate, as represented by the calculated error rate variable, is below a configured error rate disable percentage threshold, which is referred to within this example as a configured Automatic Disable Percentage Threshold (e.g., error rate below Automatic Disable Percentage Threshold). If this comparison results in an affirmative determination, this branch of the logical operation is true.

As such, the validation check verifies that it has executed a configured minimal number of times, and verifies that its accumulated execution statistics result in an error rate below its configured automatic disable percentage threshold. If both are true, the validation check disables itself. Accordingly, using a process such as that represented by the example pseudo code above, a validation check may autonomously accumulate and process its own statistics and disable itself as configured. Each validation check may be configured independently/differently. Additionally, while error rate is used in this example, success rate may additionally/alternatively be used as appropriate for a given implementation.

As also described herein, validation checks may be re-enabled at any time. Additionally, the respective parameters may be cleared or set to any appropriate level to cause the validation check to again execute for a selected number of times.

It should be noted that conception of the present subject matter resulted from recognition of certain limitations associated with validation check/assertions usage. For example, it was observed that adding validation steps may degrade software/system performance below a level that is acceptable. It was determined that, as a result, developers remove validation checks from software builds prior to deployment to avoid the performance degradation within the deployed systems, and these validation checks that were useful during development for troubleshooting are not available in the deployed systems. It was additionally observed that a software build that functions properly within one deployment environment may have issues within another deployment environment. As such, it was determined that using validation checks only within the development environment does not necessarily guarantee proper functionality in one or more different deployed systems. It was further determined that there is no current solution to enabling and/or disabling validation checks. As a result of these observations, it was determined that an ability to enable/disable validation checks within deployed systems would improve deployed system validation. It was additionally determined that an ability to enable/disable validation checks within deployed systems based on their actual utility would improve performance within the deployed systems after sufficient validation data for the deployed system has been obtained. The present subject matter improves validation check usage by providing for progressive validation check disabling based upon validation results, as described above and in more detail below. As such, improved deployed system validation and performance in the context of deployed system validation may be obtained over time through use of the present technology.

The progressive validation check disabling based upon validation results described herein may be performed in real time to allow prompt responsiveness to validation check performance to progressively disable validation checks that successfully pass a configured number of times. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for progressive validation check disabling based upon validation results. A development computing device 102 communicates via a network 104 with several other devices. The other devices include a deployed system_1 106 through a deployed system_M 108. Code may be deployed by the development computing device 102 to the deployed system_1 106 through the deployed system_M 108. The deployed system_1 106 through the deployed system_M 108 generally represent a deployed server or other form of computing device that may execute code that includes validation checks to be progressively disabled over time based upon their execution results, as described above and in more detail below. An execution results database 110 is used to store execution results, such as accumulated and aggregated execution statistics for validation checks, for access by the development computing device 102 or otherwise as appropriate for a given implementation.

As will be described in more detail below in association with FIG. 2 through FIG. 4, the deployed system_1 106 through the deployed system_M 108 may each provide programmatic progressive validation check disabling based upon validation results. The progressive validation check disabling based upon validation results is based upon accumulation and aggregation of execution statistics for the respective validation checks, and programmatic disabling of the validation checks over time based upon the gathered and aggregated statistics. The validation control task that monitors and disables validation checks may be executed at the development computing device 102, or at the respective deployed system_1 106 through the deployed system_M 108. Where the validation control task is executed at the deployed system_1 106 through the deployed system_M 108, the validation control task may be implemented by a distinct module that monitors several validation checks and selectively disables the validation checks based upon the accumulated and aggregated execution statistics. Alternatively, the validation control task may be distributed and implemented by the validation checks themselves to allow each validation check to disable itself (e.g., self-disable) based upon the accumulated and aggregated execution statistics. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
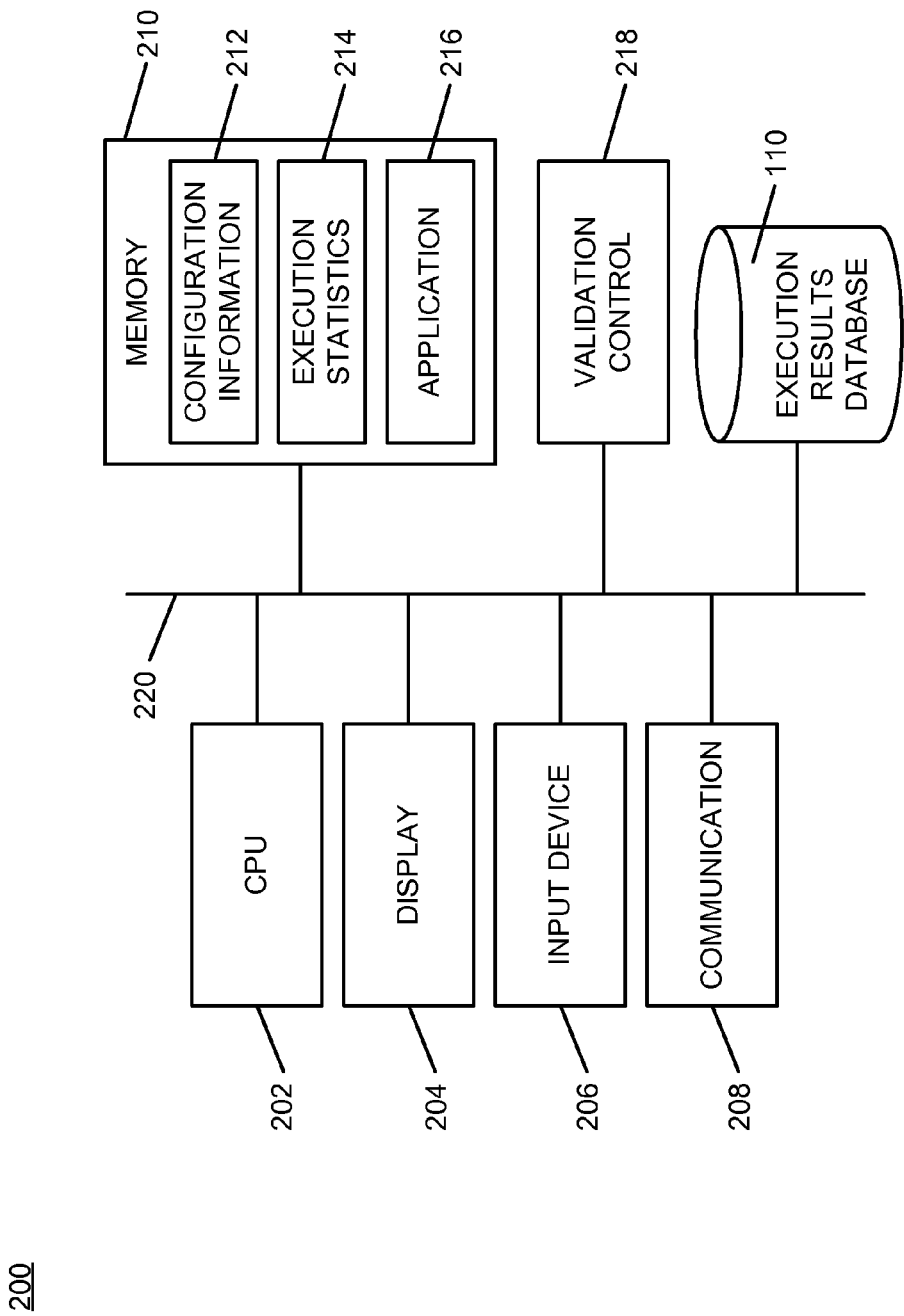
FIG. 2 is a block diagram of an example of an implementation of a core processing module capable of performing progressive validation check disabling based upon validation results according to an embodiment of the present subject matter.

FIG. 2 is a block diagram of an example of an implementation of a core processing module 200 capable of performing progressive validation check disabling based upon validation results. The core processing module 200 may be associated with either the development computing device 102 or with the deployed system_1 106 through the deployed system_M 108, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of validation checks, such as accumulation, aggregation, and monitoring of validation check statistics and validation execution control, in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, such as where the deployed system_1 106 through the deployed system_M 108 are embedded computing devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a configuration information storage area 212 that stores configured thresholds for use in determining whether to disable validation checks by the core processing module 200. As described above, the configured thresholds may be configured and stored in association with each validation check as appropriate for a given implementation. As such, the configuration information storage area 212 may be distributed across the configured validation checks. One or more configuration files may be maintained within the configuration information storage area 212 that document information, such as the respective threshold values associated with each validation check that specify the criteria for keeping the respective validation checks enabled.

The memory 210 also includes an execution statistics storage area 214 that may be used to accumulate/store validation check execution statistics and may store aggregation results for comparison with the configured thresholds for disabling validation checks. As described above, the accumulation, aggregation, and comparison of validation checks along with any resulting disabling of validation checks may be performed by each validation check as appropriate for a given implementation. As such, the execution statistics storage area 214 may be distributed across the configured validation checks.

The memory 210 also includes an application area 216. The application area 216 represents storage and execution space for one or more applications that may include and execute validation checks. As described above, as the validation checks execute, execution statistics may be accumulated, such as within the execution statistics storage area 214 and run-time determinations may be made with respect to whether to disable individual validation checks during run-time.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A validation control module 218 is also illustrated. The validation control module 218 provides validation check statistics accumulation, aggregation, and processing for the core processing module 200, as described above and in more detail below. The validation control module 218 implements the automated progressive validation check disabling based upon validation results of the core processing module 200.

It should also be noted that the validation control module 218 may form a portion of other circuitry described without departure from the scope of the present subject matter. Further, the validation control module 218 may alternatively be implemented as an application stored within the memory 210. In such an implementation, the validation control module 218 may include instructions executed by the CPU 202 for performing the functionality described herein. The CPU 202 may execute these instructions to provide the processing capabilities described above and in more detail below for the core processing module 200. The validation control module 218 may form a portion of an interrupt service routine (ISR), a portion of an operating system, a portion of a browser application, or a portion of a separate application without departure from the scope of the present subject matter. Alternatively, the validation control module 218 may be distributed and implemented by the executing validation checks themselves, as appropriate for a given implementation.

The execution results database 110 is also shown associated with the core processing module 200 within FIG. 2 to show that the execution results database 110 may be coupled to the core processing module 200 without requiring external connectivity, such as via the network 104. For example, the execution results database 110 may be locally associated with the development computing device 102 or with one or more of the deployed system_1 106 through the deployed system_M 108, as appropriate for a given implementation.

The CPU 202, the display 204, the input device 206, the communication module 208, the memory 210, the validation control module 218, and the execution results database 110 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the execution results database 110 is illustrated as a separate component for purposes of example, the information stored within the execution results database 110 may also/alternatively be stored within the memory 210 without departure from the scope of the present subject matter. Accordingly, the core processing module 200 may take many forms and may be associated with many platforms.

Figure 3:
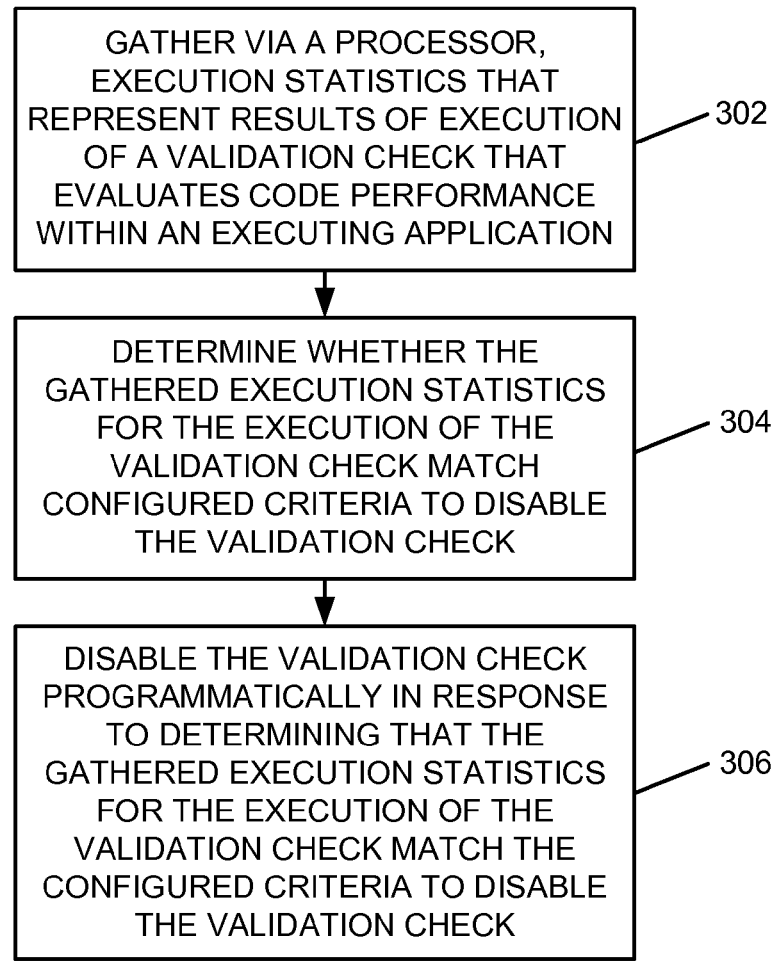
FIG. 3 is a flow chart of an example of an implementation of a process for progressive validation check disabling based upon validation results according to an embodiment of the present subject matter.
Figure 4:
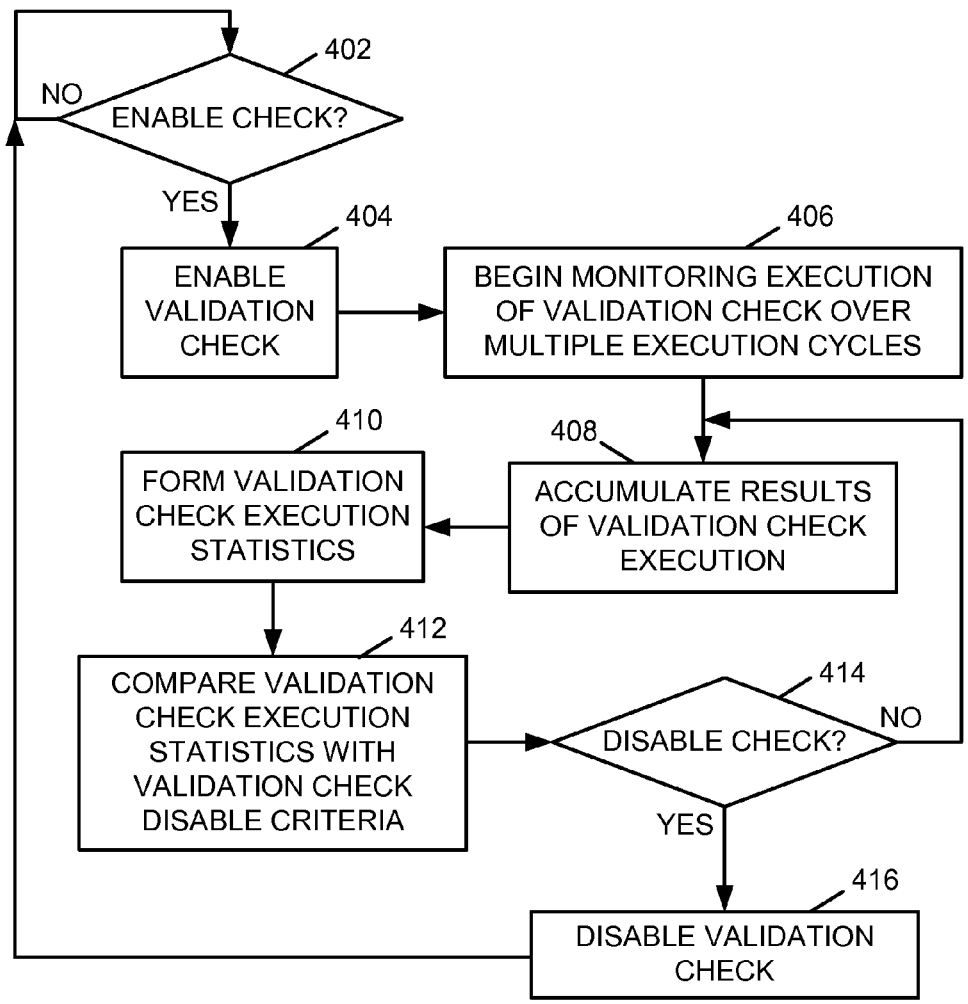
FIG. 4 is a flow chart of an example of an implementation of a process for progressive validation check disabling based upon validation results according to an embodiment of the present subject matter.

FIG. 3 through FIG. 4 described below represent example processes that may be executed by devices, such as the core processing module 200, to perform the automated progressive validation check disabling based upon validation results associated with the present subject matter. Many other variations on the example processes are possible and all are considered within the scope of the present subject matter. The example processes may be performed by modules, such as the validation control module 218 (e.g., either as a separate module or as part of each validation check) and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for progressive validation check disabling based upon validation results. At block 302, the process 300 gathers, via a processor, execution statistics that represent results of execution of a validation check that evaluates code performance within an executing application. At block 304, the process 300 determines whether the gathered execution statistics for the execution of the validation check match configured criteria to disable the validation check. At block 306, the process 300 disables the validation check programmatically in response to determining that the gathered execution statistics for the execution of the validation check match the configured criteria to disable the validation check.

FIG. 4 is a flow chart of an example of an implementation of a process 400 for progressive validation check disabling based upon validation results. The process 400 is illustrated and described with respect to enabling, monitoring, and disabling a single validation check for ease of description purposes. However, the process 400 is understood to represent processing associated with each validation check that is monitored for disabling, and as such, represents a distributed process that operates on multiple validation checks.

At decision point 402, the process 400 makes a determination as to whether a validation check enable instruction has been detected. The validation checks enable instruction may be the result of an initial execution of a validation check, the result of a developer input request to reactivate a disabled validation check, or otherwise as appropriate for a given implementation. In response to determining that a validation check enable instruction has been detected, the process 400 enables the validation check at block 404. As such, programmatic reactivation of a disabled validation check may be performed in response to detecting the validation check enable instruction. At block 406, the process 400 begins monitoring the execution of the validation check over multiple execution cycles of the validation check execution.

At block 408, the process 400 accumulates results of the execution of the validation check over the multiple execution cycles of the validation check. For example, the process 400 may increment a total validation execution count parameter in response to each execution of the validation check. The process 400 may also increment a failed validation execution count parameter in response to each execution of the validation check that detected a problem with the execution of the executing application evaluated by the validation check. The process 400 may additionally/alternatively increment a successful validation execution count parameter in response to each execution of the validation check that did not detect a problem with the execution of the executing application evaluated by the validation check.

At block 410, the process 400 forms validation check execution statistics based upon the accumulated results of the validation check execution over the multiple execution cycles of the validation check. Formation of the execution statistics may include calculation of an error rate or success rate for the validation check based upon the accumulated execution statistics. For an error rate calculation, the process 400 may, for example, divide the failed validation execution count parameter by the total validation execution count parameter. For a success rate calculation, the process 400 may, for example, divide the successful validation execution count parameter by the total validation execution count parameter.

At block 412, the process 400 compares the validation check execution statistics with validation check disable criteria. For example, the process 400 may determine whether the failed validation execution count parameter divided by the total validation execution count parameter (e.g., the error rate) is less than a configured value of a configurable disable percentage threshold parameter. Alternatively and conversely, the process 400 may utilize a success rate as described above, and determine whether the success rate is greater than a configured value of a configurable disable percentage threshold parameter.

As described above, validation checks may also be configured to execute a minimal number of times prior to being disabled in addition to meeting the configured error rate (or success rate) values. As such, at decision point 414, the process 400 determines whether to disable the validation check based upon the number of executions of the validation check and the comparison of the validation check execution statistics with validation check disable criteria. For example, the process 400 may determine that both the error rate is less than a configured value of the configurable disable percentage threshold parameter and the total validation execution count parameter at least equals a configured value of the configurable disable minimal count parameter.

In response to determining at decision point 414 not to disable the validation check based upon the number of executions of the validation check and the comparison of the validation check execution statistics with validation check disable criteria, the process 400 returns to block 408 to continue accumulation of results of execution of the validation check and iterates as described above. In response to determining at decision point 414 to disable the validation check based upon the number of executions of the validation check and the comparison of the validation check execution statistics with validation check disable criteria, the process 400 disables the validation check at block 416. The process 400 returns to decision point 402 and iterates as described above. Again as described herein, the validation check may be reactivated at any time as appropriate for a given implementation.

As such, the process 400 monitors execution of validation checks and accumulates execution results of the validation checks. The process 400 forms execution statistics, such as error rate and/or success rate. The process 400 compares the execution statistics with additional criteria, such as the total validation check execution count, and disables validation checks that match the validation check disable criteria. As such, the process 400 operates to manage a configured set of criteria and to disable validation checks based upon that configured set of criteria. Accordingly, validation checks may be deployed to evaluate in-system code execution, and may be progressively disabled over time based upon validation results.

As described above in association with FIG. 1 through FIG. 4, the example systems and processes provide progressive validation check disabling based upon validation results. Many other variations and additional activities associated with progressive validation check disabling based upon validation results are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    gathering, via a processor, execution statistics that represent results of execution of a validation check that evaluates code performance within an executing application;
    determining whether the gathered execution statistics for the execution of the validation check match configured criteria to disable the validation check;
    disabling the validation check programmatically in response to determining that the gathered execution statistics for the execution of the validation check match the configured criteria to disable the validation check;
    receiving an instruction to reactivate the disabled validation check; and
    programmatically reactivating the disabled validation check in response to the instruction.

2. The computer-implemented method of claim 1, where gathering, via the processor, the execution statistics that represent the results of the execution of the validation check that evaluates the code performance within the executing application comprises:
    monitoring the execution of the validation check over multiple execution cycles of the validation check;
    accumulating the results of the execution of the validation check over the multiple execution cycles of the validation check; and
    forming the execution statistics based upon the accumulated results of the execution of validation check over the multiple execution cycles of the validation check.

3. The computer-implemented method of claim 1, where:
    the validation check comprises a total validation execution count parameter and a failed validation execution count parameter; and
    gathering, via the processor, the execution statistics that represent the results of the execution of the validation check that evaluates the code performance within the executing application comprises:
        incrementing the total validation execution count parameter in response to each execution of the validation check; and
        incrementing the failed validation execution count parameter in response to each execution of the validation check that detected a problem with the execution of the executing application.

4. The computer-implemented method of claim 3, where:
    the validation check comprises a configurable disable percentage threshold parameter and a configurable disable minimal count parameter; and
    determining whether the gathered execution statistics for the execution of the validation check match the configured criteria to disable the validation check comprises:
        determining whether the failed validation execution count parameter divided by the total validation execution count parameter is less than a configured value of the configurable disable percentage threshold parameter; and
        determining whether the total validation execution count parameter at least equals a configured value of the configurable disable minimal count parameter.

5. The computer-implemented method of claim 4, where disabling the validation check programmatically in response to determining that the gathered execution statistics for the execution of the validation check match the configured criteria to disable the validation check comprises:
    disabling the validation check programmatically in response to determining that both:
        the failed validation execution count parameter divided by the total validation execution count parameter is less than the configured value of the configurable disable percentage threshold parameter; and
        the total validation execution count parameter at least equals the configured value of the configurable disable minimal count parameter.

6. The computer-implemented method of claim 1, where the validation check itself performs the gathering of the execution statistics, the determining of whether the execution statistics for the execution of the validation check match the configured criteria to disable the validation check, and the programmatic disabling of the validation check in response to determining that the gathered execution statistics for the execution of the validation check match the configured criteria to disable the validation check.

7. A system, comprising:
a memory; and
a processor programmed to:
gather execution statistics within the memory that represent results of execution of a validation check that evaluates code performance within an executing application;
determine whether the gathered execution statistics for the execution of the validation check match configured criteria to disable the validation check;
disable the validation check programmatically in response to determining that the gathered execution statistics for the execution of the validation check match the configured criteria to disable the validation check;
receive an instruction to reactivate the disabled validation check; and
programmatically reactivate the disabled validation check in response to the instruction.

8. The system of claim 7, where in being programmed to gather the execution statistics within the memory that represent the results of the execution of the validation check that evaluates the code performance within the executing application, the processor is programmed to:
monitor the execution of the validation check over multiple execution cycles of the validation check;
accumulate the results of the execution of the validation check over the multiple execution cycles of the validation check; and
form the execution statistics based upon the accumulated results of the execution of validation check over the multiple execution cycles of the validation check.

9. The system of claim 7, where:
the validation check comprises a total validation execution count parameter and a failed validation execution count parameter; and
in being programmed to gather the execution statistics within the memory that represent the results of the execution of the validation check that evaluates the code performance within the executing application, the processor is programmed to:
increment the total validation execution count parameter in response to each execution of the validation check; and
increment the failed validation execution count parameter in response to each execution of the validation check that detected a problem with the execution of the executing application.

10. The system of claim 9, where:
the validation check comprises a configurable disable percentage threshold parameter and a configurable disable minimal count parameter;
in being programmed to determine whether the gathered execution statistics for the execution of the validation check match the configured criteria to disable the validation check, the processor is programmed to:
determine whether the failed validation execution count parameter divided by the total validation execution count parameter is less than a configured value of the configurable disable percentage threshold parameter; and
determine whether the total validation execution count parameter at least equals a configured value of the configurable disable minimal count parameter; and in being programmed to disable the validation check programmatically in response to determining that the gathered execution statistics for the execution of the validation check match the configured criteria to disable the validation check, the processor is programmed to:
disable the validation check programmatically in response to determining that both:
the failed validation execution count parameter divided by the total validation execution count parameter is less than the configured value of the configurable disable percentage threshold parameter; and
the total validation execution count parameter at least equals the configured value of the configurable disable minimal count parameter.

11. The system of claim 7, where the processor is programmed to execute the validation check and the validation check itself performs the gathering of the execution statistics, the determining of whether the execution statistics for the execution of the validation check match the configured criteria to disable the validation check, and the programmatic disabling of the validation check in response to determining that the gathered execution statistics for the execution of the validation check match the configured criteria to disable the validation check.

12. A computer program product, comprising:
a computer readable storage medium having computer readable program code embodied therewith, where the computer readable program code when executed on a computer causes the computer to:
gather execution statistics that represent results of execution of a validation check that evaluates code performance within an executing application;
determine whether the gathered execution statistics for the execution of the validation check match configured criteria to disable the validation check;
disable the validation check programmatically in response to determining that the gathered execution statistics for the execution of the validation check match the configured criteria to disable the validation check;
receive an instruction to reactivate the disabled validation check; and
programmatically reactivate the disabled validation check in response to the instruction.

13. The computer program product of claim 12, where in causing the computer to gather the execution statistics that represent the results of the execution of the validation check that evaluates the code performance within the executing application, the computer readable program code when executed on the computer causes the computer to:
monitor the execution of the validation check over multiple execution cycles of the validation check;
accumulate the results of the execution of the validation check over the multiple execution cycles of the validation check; and
form the execution statistics based upon the accumulated results of the execution of validation check over the multiple execution cycles of the validation check.

14. The computer program product of claim 12, where:
the validation check comprises a total validation execution count parameter and a failed validation execution count parameter; and
in causing the computer to gather the execution statistics that represent the results of the execution of the validation check that evaluates the code performance within the executing application, the computer readable program code when executed on the computer causes the computer to:

increment the total validation execution count parameter in response to each execution of the validation check; and increment the failed validation execution count parameter in response to each execution of the validation check that detected a problem with the execution of the executing application.

15. The computer program product of claim 14, where:

the validation check comprises a configurable disable percentage threshold parameter and a configurable disable minimal count parameter; and in causing the computer to determine whether the gathered execution statistics for the execution of the validation check match the configured criteria to disable the validation check, the computer readable program code when executed on the computer causes the computer to:

determine whether the failed validation execution count parameter divided by the total validation execution count parameter is less than a configured value of the configurable disable percentage threshold parameter; and determine whether the total validation execution count parameter at least equals a configured value of the configurable disable minimal count parameter.

16. The computer program product of claim 15, where in causing the computer to disable the validation check programmatically in response to determining that the gathered execution statistics for the execution of the validation check match the configured criteria to disable the validation check, the computer readable program code when executed on the computer causes the computer to:

disable the validation check programmatically in response to determining that both:

the failed validation execution count parameter divided by the total validation execution count parameter is less than the configured value of the configurable disable percentage threshold parameter; and the total validation execution count parameter at least equals the configured value of the configurable disable minimal count parameter.

17. The computer program product of claim 12, where the computer readable program code when executed on the computer causes the computer to execute the validation check and the validation check itself performs the gathering of the execution statistics, the determining of whether the execution statistics for the execution of the validation check match the configured criteria to disable the validation check, and the programmatic disabling of the validation check in response to determining that the gathered execution statistics for the execution of the validation check match the configured criteria to disable the validation check.

* * * * *